W. L. BATTLE.
Cattle-Pokes.
No. 150,743. Patented May 12, 1874.
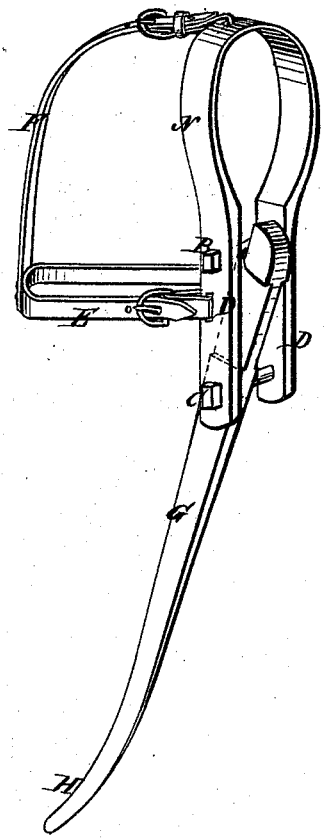
WITNESSES.
INVENTOR.
BY
ATTORNEYS:

UNITED STATES PATENT OFFICE.

WARREN L. BATTLE, OF GENEVA, GEORGIA.

IMPROVEMENT IN CATTLE-POKES.

Specification forming part of Letters Patent No. 150,743, dated May 12, 1874; application filed December 1, 1873.

*To all whom it may concern:*

Be it known that I, WARREN L. BATTLE, of Geneva, in the county of Talbot and State of Georgia, have invented a new and Improved Cattle-Poke, of which the following is a specification:

My improved cattle-poke consists of a wood or metal bow, fitting and secured close to the head by a face and nose strap around the neck of the animal, the lower ends of said bow being connected together by a couple of pins or keys, from the lower of which hangs a long curved rod of wood, whose upper end rises above and behind the upper pin or key, and thus causes the lower end, which is curved forward to some extent, to project still farther forward, so as to catch in the fence when the animal tries to jump. The pivot allows the rod to lie on the ground while the animal feeds, and said rod rises high enough above the ground when the animal holds his head up to clear it, so that he can walk about freely.

The drawing is a perspective view of a poke constructed according to my invention.

A is the bow, which fits on the neck just behind the head, and is secured by the pins B and C passing through the ends D, projecting below the under side of the neck; also, by the nose-strap E and the face-strap F, which are to be connected to it by buckles, so as to adjust the poke to animals of different kinds. G represents the rod hanging down from the lower pin C, and extending up behind pin B, and curving forward at H, so as to be forced into the fence when the animal tries to jump, but so that it will lie down on the ground when the animal grazes, the rod projecting directly forward, and the animal grazing on either side of it.

Having thus described my invention, I claim as new and desire to secure by Letters Patent—

The bow A, having the projecting ends D, connected by pins B and C, rod G, and the straps E and F, all combined and arranged substantially as specified.

WARREN L. BATTLE.

Witnesses:
C. H. AUSTIN,
MATHEW T. McCRARY.